Figure 1:
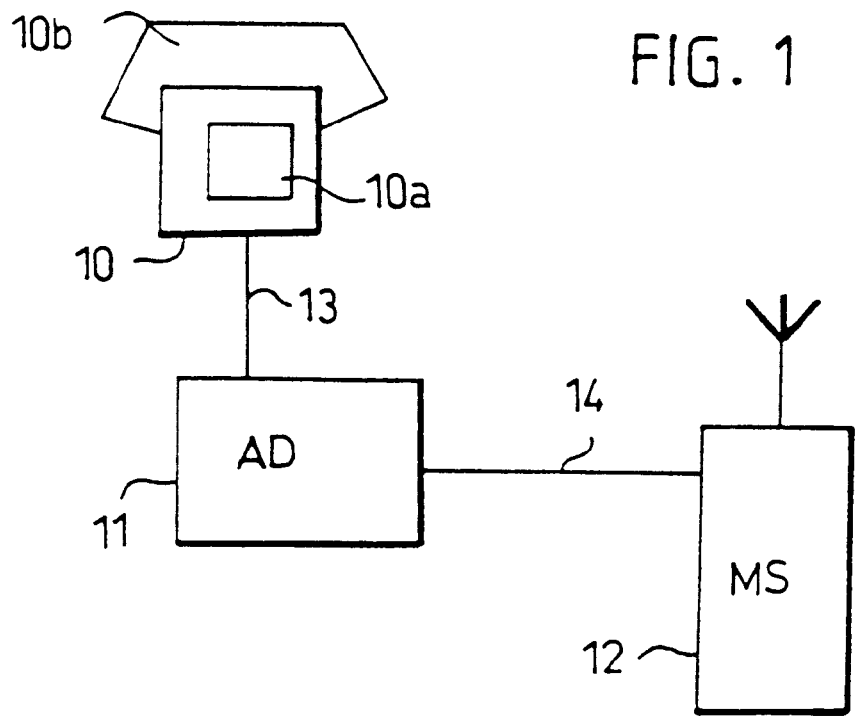

United States Patent

Berg et al.

Patent Number: 6,108,531
Date of Patent: Aug. 22, 2000

[54] TERMINAL EQUIPMENT PROVIDING PAYMENT DATA IN A CELLULAR RADIO SYSTEM

[75] Inventors: Jukka Berg, Oulu; Kimmo Savolainen, Pyhäjoki, both of Finland

[73] Assignee: NE-Products Oy, Oulu, Finland

[21] Appl. No.: 08/809,216

[22] PCT Filed: Sep. 19, 1995

[86] PCT No.: PCT/FI95/00511

§ 371 Date: Apr. 16, 1997

§ 102(e) Date: Apr. 16, 1997

[87] PCT Pub. No.: WO96/09734

PCT Pub. Date: Mar. 28, 1996

[30] Foreign Application Priority Data

Sep. 20, 1994 [FI] Finland ................................. 944363

[51] Int. Cl.[7] ........................... H04M 15/00; H04B 1/38
[52] U.S. Cl. ........................................... 455/408; 455/569
[58] Field of Search .................................... 455/405–408, 455/569; 379/132, 130, 144, 136, 125, 114, 420 D, 432, 145; 235/380

[56] References Cited

U.S. PATENT DOCUMENTS

| | | | |
|---|---|---|---|
| 4,776,000 | 10/1988 | Parienti | 455/407 |
| 4,777,646 | 10/1988 | Harris | 379/91 |
| 5,046,085 | 9/1991 | Godsey et al. | 455/407 |
| 5,144,649 | 9/1992 | Zicker et al. | 379/59 |
| 5,208,446 | 5/1993 | Martinez | 455/406 |
| 5,247,160 | 9/1993 | Zicker | 235/380 |
| 5,272,747 | 12/1993 | Meads | 379/59 |
| 5,361,297 | 11/1994 | Ortiz et al. | 379/132 |
| 5,388,148 | 2/1995 | Seiderman | 455/404 |
| 5,561,706 | 10/1996 | Fenner | 455/406 |
| 5,732,346 | 3/1998 | Lazaridis et al. | 455/406 |
| 5,748,720 | 5/1998 | Loder | 455/407 |
| 5,809,124 | 9/1998 | Bayod | 455/407 |
| 5,862,183 | 1/1999 | Lazaridis et al. | 375/295 |

FOREIGN PATENT DOCUMENTS

| | | |
|---|---|---|
| 0600822 | 12/1993 | European Pat. Off. . |
| 0651586 | 8/1994 | European Pat. Off. . |
| 2179524 | 3/1987 | United Kingdom . |

OTHER PUBLICATIONS

Collesei et al., Short Message Service Based Applications in the GSM network, Personal, Indoor and Mobile Radio Communications, 1994. Wireless Networks—Catching the Mobile Future., 5th IEEE International Symposium, pp. 939–943, 1994.

Primary Examiner—Dwayne D. Bost
Assistant Examiner—Tracy M. Legree
Attorney, Agent, or Firm—Ladas & Parry

[57] ABSTRACT

A cellular radio system includes a unit for controlling payment traffic and a terminal equipment which can be used as a pay telephone in the cellular radio system. The terminal equipment includes a control unit connected directly to the cellular transceiver without a two-wire connection and a collecting means, for controlling collection operations, connected the control unit. The payment traffic is transmitted from the terminal equipment to unit for controlling payment traffic as short data messages over the cellular radio system. The terminal equipment further includes a hands free facility.

11 Claims, 2 Drawing Sheets

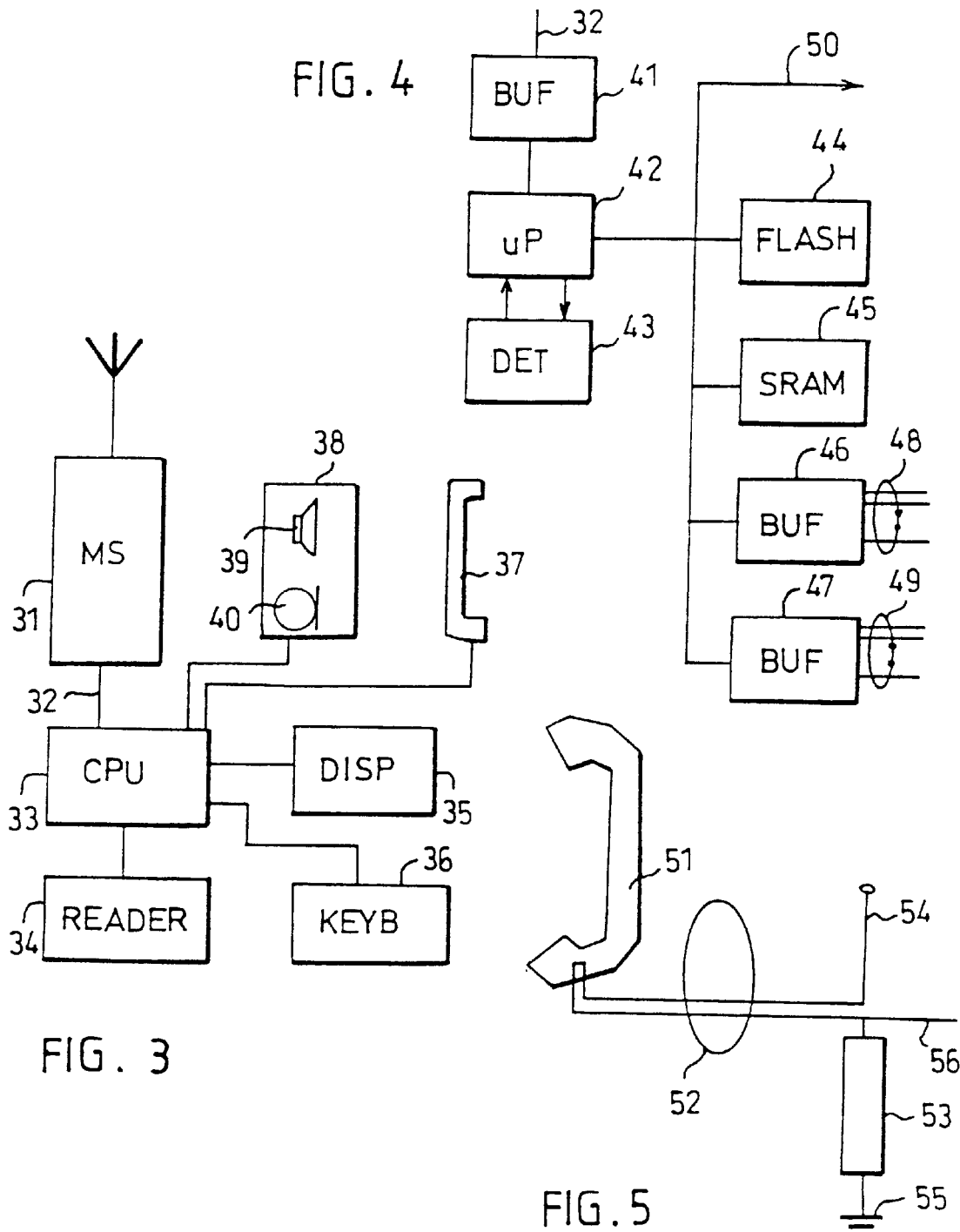

TERMINAL EQUIPMENT PROVIDING PAYMENT DATA IN A CELLULAR RADIO SYSTEM

The present invention relates to a terminal equipment in a cellular radio system, said equipment comprising a cellular radio transceiver.

As cellular radio systems become common and as their coverage areas grow, these systems replacing systems implemented with fixed wire telephone connections in many places, it has become necessary to develop pay telephones utilizing cellular telephone systems. A need for such telephones exists for instance in areas where no fixed wire telephone connections have been constructed, or in applications where a pay telephone is located in an environment where a connection to a fixed network is not easily available, for instance in moving vehicles.

The known pay telephone solutions wherein a telephone uses the radio path in establishing a connection are implemented with the arrangement according to FIG. 1. The known arrangements comprise a terminal equipment 10, which is an apparatus resembling a conventional telephone set, comprising a dialling means 10a for dialling a telephone number and a receiver 10b. The terminal equipment 10 may be for instance a dual tone dial or pulse dial telephone set, telefax, modem, or a similar apparatus. The terminal equipment 10 is connected to a teleadapter 11 by means of a conventional two-wire connection 13. A cellular radio transceiver 12 is connected to the teleadapter by means of a data link connection 14, such as a bus interface or the like. The transceiver 12 may be for instance a conventional cellular telephone without a user connection. The purpose of the teleadapter 11 is to adapt the user connection and electric connection of the radio transceiver to correspond to the characteristics of the two-wire subscriber connection of a fixed wire telephone network, i.e. to adapt the operation of the terminal equipment 10 providing a user connection of a conventional pay telephone to the operation of the radio transceiver 12 of a cellular radio system. Structurally, the teleadapter may be integrated to be in association with the radio transceiver, but corresponding connections (two-wire connection and bus interface) can however be observed.

As regards the operator, an essential characteristic of a pay telephone is the transmitting of monitoring and control data from the pay telephone to the operator. This data, which will below be referred to as call data, comprises for instance traffic reports, failure reports, notices of need for maintenance, the amount of coins in coin phones, the data of cards used in card phones etc. The call data is bidirectional data transmission, where the pay telephone transmits data on its operation to the operator station and the operator station sets the functional parameters of the pay telephone.

In conventional wire telephone network pay telephones, the call data is transmitted to the operator by using a separate telephone line. Said apparatuses thus comprise two telephone connections: one for a speech connection and the other for transmitting telephone data. In pay telephones used in known cellular radio systems, data transmission is performed in such a manner that a telephone is provided with two separate radio transceivers, one of which is reserved for telephone data transmission. Another known way is to provide a telephone with an automatism performing a maintenance call to the operator center always when required. A third known manner is to provide the operator center with a program which regularly performs a maintenance call to all the pay telephones it controls.

In the known solutions to implement a pay telephone in cellular radio systems, attempts have been made to imitate as closely as possible the operation of a conventional pay telephone, which has resulted in an implementation where a two-wire connection has been established in practice by means of a teleadapter, to which two-wire connection it has been possible to connect an apparatus resembling a conventional pay telephone. The use of a teleadapter causes additional costs, however, and it complicates the implementation of the telephone structure.

The object of the present invention is thus to provide a terminal equipment, which can be used as a pay telephone in a cellular radio system and the structure of which is simpler than that of the previous solutions, and which can thus be advantageously implemented. The object of the invention is further to implement a terminal equipment to be used as a pay telephone, which is capable of transmitting call data more economically than previously to the operator station.

This is achieved with the terminal equipment described in the introduction, characterized in that the terminal equipment comprises a control unit which is connected directly to the cellular radio transceiver, and a collecting means connected to the control unit.

The terminal equipment of the invention does not thus comprise at all a previously required teleadapter, but the user connection is implemented directly via the control unit connected to the cellular radio transceiver. The two-wire connection used in the previous solutions is not required at all in the terminal equipment of the invention. It is thus possible to implement the terminal equipment in a simpler manner with a smaller number of components.

A conventional cellular radio telephone can be used as a cellular radio transceiver in the terminal equipment. The control unit can thus be connected to the radio phone via a bus interface. A bus interface typically comprises an audio connection and a data line, which can be either a series or a parallel connection. The control unit can also be integrated fixedly into the cellular radio telephone, whereby no separate bus interface is required.

The terminal equipment of the invention can be implemented in any cellular radio system, such as the NMT, AMPS, TACS and GSM. In the terminal equipment of the invention, it is possible to apply the characteristics of the cellular radio systems effectively to the special requirements of a pay telephone. Especially the above-mentioned call data transmitting can be implemented for instance in the GSM and DCS systems by using so called short messages for transmitting payment data. The payment data can thus be transmitted during a call, whereby it is not necessary to reserve a separate radio channel for this purpose, but the transmitting can be handled by means of signalling taking place during the call.

Figure 2:
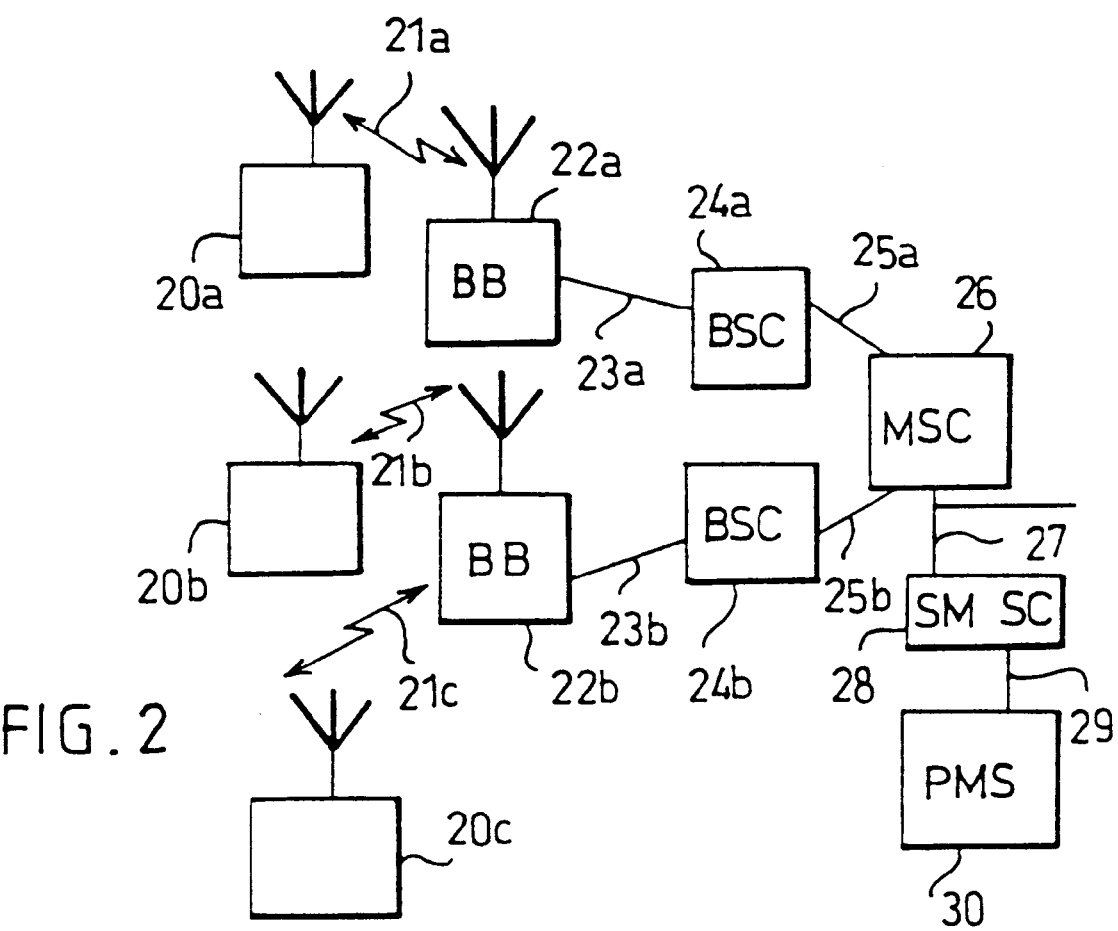

In the following, the invention will be described in more detail with reference to the examples of the accompanying drawings, in which FIG. 1 shows the described prior art pay telephone solution, FIG. 2 illustrates the structure of a pay telephone system by means of a diagram, FIG. 3 shows an example of the structure of the terminal equipment of the invention at the level of a block diagram, FIG. 4 illustrates a possible structure of the control unit by means of a block diagram, and FIG. 5 illustrates a possible manner of implementing the monitoring of the condition of a receiver unit.

In the following, the invention will be described in more detail by using as an example the digital GSM mobile telephone system, without restricting the invention thereto, however. It will be apparent that the terminal equipment of the invention can be implemented with minor modifications in any analog or digital cellular radio system, as already mentioned above.

FIG. 2 illustrates the structure of a pay telephone system implemented in a cellular radio network. The system comprises a number of pay telephones 20a–20c, each of which communicates with base stations 22a–22b via radio paths 21a–21c. As regards a radio path and a base station, the terminal equipments acting as pay telephones do not differ in any manner from conventional subscriber terminal equipments. The base stations 22a–22b typically communicate with base station controllers 24a–24b via transmission links 23a–23b, which can be implemented with an optical cable, copper cable or a radio relay link, each base station controller controlling several base stations. The base station controllers 24a–24b communicate with a mobile exchange 26 via transmission lines 25a–25b, said mobile exchange controlling the operation of the base station controllers and forwarding the calls of the terminal equipments further to a fixed network or to other parts of the cellular communication system by means of transmission lines 27. In the GSM system used as an example, the control unit or equipment 30 of the pay telephone system is connected for instance by using an X.25 connection 29 to a short message center 28, which communicates with GSM cellular networks and the mobile exchanges thereof. The above description of a cellular radio system thus relates to the GSM system, but it will be apparent that even though the structure in other systems differs in its details from what is described, there are no differences as regards the essential parts of the structure. It should be noticed that it is possible to implement a pay telephone system without a short message center also in the GSM system by connecting the control equipment 30 of the pay telephone system to the cellular radio system in other known ways, for instance by means of a modem.

FIG. 3 illustrates an example of the preferred embodiment of the terminal equipment of the invention. The terminal equipment of the invention comprises a cellular radio transceiver 31 and a control unit 33, which is connected directly to the transceiver 31 without a two-wire connection. The terminal equipment of the invention also comprises a collecting means 34, which is connected to the control unit 33. The terminal equipment also typically comprises a dialling means 36, with which is performed the dialling of a desired telephone number, and a display equipment 35, and a receiver 37. The terminal equipment may also comprise means 38 enabling a hands free facility, said means comprising a loudspeaker 39 and a microphone 40, and the required amplifiers. Part or all of the above-mentioned components can be located, if desired, as integrated directly into the transceiver 31, but they can also be implemented as separate means, even if structurally within the same housing.

The purpose of the transceiver unit 31 is to establish, if required, a radio connection to a base station in order that a call could be forwarded. The unit 31 also handles all the procedures relating to the maintenance of the radio path and the call, such procedures being normally the task of a mobile telephone.

The purpose of the control unit 33 is to control the pay telephone. The control unit typically comprises a microprocessor, fixed and reprogrammable memory circuits, multiplexing means and switches. The control unit controls the operation of the other units of the equipment, keeps a record of the performed calls and handles the charging. The operation of the control unit does not differ in its main respects from the operation of the control units of known pay telephones.

FIG. 4 illustrates a possible way of implementing the control unit 33. In the figure, the control unit is connected to the transceiver unit via a bus 32, and the control unit is provided with a bus buffer 41, which can be implemented with separate components. The unit comprises a microprocessor 42, which can be for instance the model Intel 80C32 or the like. Monitoring means 43 are connected to the processor, said means detecting if the performance of the processor program is interrupted due to an error and restarting the processor if need be. The control unit further comprises memory means 44, into which is stored a program code. The memory means 44 can be implemented for instance by means of a so called flash memory circuit, which can be updated. The control unit further comprises other memory means 45, into which is stored for instance the payment transaction data. These other memory means 45 are battery secured. The unit further comprises buffering means 46, 47, of which the buffer 46 acts as a data out buffer, from which leave lines 48 for controlling the collecting means 34, to audio switches, and for controlling the dialling means 36. The buffering means 47 act as a data in buffer, the lines arriving into which being connected for instance to the dialling means 36, the receiver 37, and the collecting means 34. Furthermore, there is a connection 50 from the processor 42 to the display means 35.

The purpose of the collecting means 34 is to enable a user to be charged for performing a call on the basis of the current tariff and the characteristics of the performed call. The collecting means 34 can be implemented in various known ways. A typical implementation is to use a call card reading/writing device. The cards used may be for instance nonreusable cards which contain a certain amount of talk time and which cannot be recharged. It is also possible to use rechargeable call cards, different smart cards or credit cards. When credit cards are used, the control unit 33 must be capable of checking the credit standing. In the equipment, it is also possible to use so called remote cards, i.e cards the reading and writing of which take place without a physical contact between the reading device and the card. There is thus no need for wearing parts in the equipment, which parts for instance a magnetic card reading device comprises. It is thus also possible to implement the equipment without openings in the outer surface, which reduces a possibility of vandalism. The operation of the equipment will be described by means of examples below.

The display means 35 used may be for instance an LCD display, which is capable of displaying numerals, letters, and also graphics if desired. Typical information shown on the display is one relating to the state of the call and the charging.

The dialling means 36 can be preferably implemented by using prior art for instance by means of a 5*4 matrix keyboard and a decoder. When a user depresses a key, the state of the depressed key is forwarded to the microprocessor, which reads the code of the depressed key from the decoder. The dialling means 36 may consist of dialling means comprised by the actual transceiver, or dialling means connected to the data bus of the transceiver or to the control unit. The dialling means 36 may be located in the receiver 37 or as integrated into the housing structure.

In a situation where a user gives the terminal equipment a desired dialling number by means of the dialling means 36, the problem is the interpretation of the last digit of the dialling number. The terminal equipment is not capable of knowing in advance which dialled digit is the last digit of the dialling number after which a call should be set up to the given dialling number. The observation of the last digit is essential, because it is important that a radio connection be established as soon as possible after the dialling without any additional delay. In a mobile telephone environment, the problem is usually obviated by using a special ending key, by means of which the termination of the dialling number can be indicated. In pay telephone use, the use of a separate ending key has been avoided, because such a key is not used in wire telephones, and the average user feels the ending signal to be awkward.

In the terminal equipment of the invention it is possible to apply a known method in which a fixed, constant-length waiting period is used, for which period a possibly following next digit is waited before a transmission command is applied to the transceiver to establish a radio connection. This said constant-length waiting period may be for instance 5 seconds.

In the terminal equipment of the invention it is also possible to apply a method in which the waiting period deviates from the constant, said waiting period being determined during the dialling sequence by determining one or more characteristics representing the periods between the diallings performed in the dialling sequence so far, and by determining said waiting period by means of said characteristic or characteristics. The described calculation of a characteristic is performed several times during the dialling sequence, preferably after each dialled digit. Possible characteristics are for instance the average values and standard deviations of the periods between the diallings. The above-mentioned method is described in more detail in Finnish Patent Application 941,714, which is incorporated herein by reference.

The terminal equipment of the invention preferably also comprises a receiver 37, which is connected to the control unit 33 via a cable. The cable preferably comprises six conductors; two for a microphone, two for a loudspeaker and two for disturbance detection. With reference to FIG. 5, the terminal equipment of the invention preferably comprises means 52–56 for monitoring the connection between the control unit and a receiver 51 and to detect an interruption in the connection. As shown in FIG. 5, there are two conductors 52 in addition to the conventional four conductors in the receiver cable of the terminal equipment of the invention, said conductors 52 being connected in the receiver 51, thus forming a loop. In the control unit 33, said conductors 52 are connected in such a manner that one conductor is applied to a voltage 54, which is typically 5 volts, and the other conductor is applied to ground potential 55 via a resistor 53. The output 56 is applied to the control unit 33. When the receiver cable is undamaged, the output 56 is in voltage potential, preferably in 5 volts, but when the connection to the receiver is interrupted, for instance in case of vandalism when the receiver is torn off the equipment, the output 56 swings to ground potential. This is observed in the control unit 33, and the hands free facility can thus be automatically switched on. It is preferably possible to apply a message to the display unit, indicating that the equipment is still operative even if the receiver is missing. The terminal equipment may also immediately report the vandalism further to the system.

The terminal equipment of the invention preferably comprises means 38 for enabling the hands free facility. Said means can be implemented by using known components, and they comprise a loudspeaker 39, a microphone 40, and the required amplifiers for producing a sufficient volume level. The hands free facility may be switched on by means of the dialling means 36, if desired, or it is automatically switched on if vandalism prevents the receiver from being used, as described above.

In the following, the operation of the equipment of the invention in its essential respects will be described by means of examples. When there is no call in progress, the terminal equipment is in idle mode. The audio amplifiers of the display 35 are thus switched off. While in idle mode, the control unit 33 of the terminal equipment observes the connection to the receiver in the ways described above. The terminal equipment enters a standby mode when the receiver is picked up, the hands free facility key is depressed, or when a card, coin or the like is inserted into the collecting means 34.

When the receiver is picked up or the hands free facility key is depressed, a dialling tone can be heard from the receiver or the loudspeaker. In the following, assume that the collecting means 34 is a card reader. When a card is inserted into the collecting means, the terminal equipment checks the type of the card first. If the card is of an acceptable type, the terminal equipment checks the validity of the card for instance in the list of unacceptable cards stored in its memory, or with other known methods.

When the user has dialled a number with the dialling means 36, the transceiver sets up a connection to a base station. The terminal equipment obtains information on the tariff used via the radio telephone system by using known pay telephone methods, and it is possible to display information relating to the collection on the display 35.

Naturally, it is also possible to make emergency calls from the terminal equipment, these calls being programmed into the control unit 33. When a user dials such an emergency number, the call is connected without it being necessary to insert a coin or card into the collecting means 34. In the terminal equipment of the invention, making an emergency call is preferably implemented in such a manner that the control unit monitors the numbers dialled with the dialling means 36, and when an emergency number sequence is observed, the call is set up immediately without the above-mentioned constant period delay or an adaptive delay.

As mentioned earlier, a pay telephone must forward the information on payment transactions to the system operator. In the terminal equipment of the invention, payment information can be transmitted preferably during calls without it being necessary to establish a separate radio connection for data transmission. The terminal equipment of the invention comprises means 31, 33 for transmitting the payment data of the last call performed to the control unit or equipment 30 controlling the payment traffic during the next call performed from the terminal equipment without the performed call being disturbed or the caller being aware of the procedure. In the preferred embodiment of the equipment of the invention, it is carried out by utilizing short messages, which can be transmitted as signalling or short data messages during a call for instance in the GSM system.

In the GSM system, the short data messages are forwarded in a centralized manner to a short message center, wherefrom they are forwarded further to a desired address, which may be for instance another terminal equipment in some other system. In the preferred embodiment of the invention, the operator equipment is connected to a short message center, wherefrom the messages intended for the operator equipment are forwarded to their destination. Short messages can be used in all data traffic between a pay telephone and the operator equipment, for instance for transmitting call statistics, information on lists of unacceptable cards and credit card inquiries. The software of the terminal equipment and other parameters controlling the operation of the equipment can also be updated in said manner. Said parameters may include for instance the disabling of incoming calls or of outgoing calls provided with certain routing codes, or other corresponding facilities known from pay telephones.

The location of the terminal equipment of the invention may be fixed or mobile. A fixed location means that the terminal equipment remains within the area of the same cell of a base station network. Such a terminal equipment may be for instance a pay telephone located fixedly in a building or a phone box. A mobile location means in this context that the terminal equipment may move from a cell of a base station network into another. Such a terminal equipment may be for instance a pay telephone located in a vehicle, such as a taxi or a bus, or a pay telephone which is located in a train and which moves with the train.

Even though the invention has been described above with reference to the examples according to the accompanying drawings, it will be apparent that the invention is not so restricted, but it can be modified in various ways within the scope of the inventive concept disclosed in the appended claims.

What is claimed is:

1. In a cellular radio system having a unit (30) for controlling payment traffic, improved terminal equipment comprising:

a cellular radio transceiver (31);

a control unit (33) for controlling collecting operations;

a collecting unit (34) communicating with the control unit (33) for providing payment data, wherein the control of collecting operations of the control unit directly causes the cellular radio transceiver to transmit the payment data to the unit (30) controlling the payment traffic as short data messages over the cellular radio system, means (38) for implementing a hands free facility, means (36) for switching said hands free facility on, a handset unit (37) and means (52–56) for monitoring a connection between the control unit and the handset unit to detect interruption in said connection.

2. A terminal equipment according to claim 1 wherein the control unit (33) is connected to the cellular radio transceiver (31) by means of a bus interface (32).

3. A terminal equipment according to claim 2, wherein in that the bus interface (32) comprises lines for transmitting audio information and a line for transmitting data information in series or parallel form between the control unit (33) and the cellular radio transceiver (31).

4. A terminal equipment according to claim 1 wherein the control unit (33) is integrated as a fixed part of the cellular radio transceiver (31).

5. A terminal equipment according to claim 1 wherein a display unit (35), and a dialling means (36).

6. A terminal equipment according to claim 1, comprising means (33) for switching the hands free facility on automatically if the connection to the handset unit is interrupted.

7. A terminal equipment according to claim 1 wherein the collecting means (34) is a call card reading/writing device.

8. A terminal equipment according to claim 1 wherein the collecting means (34) is operated with coins.

9. In a cellular radio system having a unit (30) for controlling payment traffic, improved terminal equipment comprising;

a cellular radio transceiver (31)

a control unit (33) for controlling collecting operations;

a collecting unit (34) communicating with the control unit (33) for providing payment data;

wherein the control of collecting operations of the control unit directly causes the cellular radio transceiver to transmit the Payment data to the unit (30) controlling the payment traffic as short data messages over the cellular radio system, and means (31, 33) for transmitting the payment data of the last call performed to the unit (30) controlling the payment traffic during the next call performed from the terminal equipment.

10. A terminal equipment according to claim 9, comprising a handset unit (35) connected to said unit (30) and means (31, 33) for transmitting a notification of an interruption of the connection between the handset unit and the unit (30).

11. In a cellular radio system having a unit (30) for controlling payment traffic, improved terminal equipment comprising;

a cellular radio transceiver (31)

a control unit (33) for controlling collecting operations;

a collecting unit (34) communicating with the control unit (33) for providing payment data;

wherein the control of collecting operations of the control unit directly causes the cellular radio transceiver to transmit the payment data to the unit (30) controlling the payment traffic as short data messages over the cellular radio system, the cellular radio system being a GSM or DSC system, and means (31, 33) for transmitting payment and call data to the unit (30) controlling the payment traffic of the system via a short message center (28).

* * * * *